US008652709B2

(12) United States Patent
Carter et al.

(10) Patent No.: US 8,652,709 B2
(45) Date of Patent: Feb. 18, 2014

(54) METHOD OF SEALING A BIPOLAR PLATE SUPPORTED SOLID OXIDE FUEL CELL WITH A SEALED ANODE COMPARTMENT

(75) Inventors: John David Carter, Bolingbrook, IL (US); Joong-Myeon Bae, Daejon (KR); Terry Alan Cruse, Lisle, IL (US); James Michael Ralph, Fairlawn, OH (US); Deborah J. Myers, Lisle, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1134 days.

(21) Appl. No.: 12/616,186

(22) Filed: Nov. 11, 2009

(65) Prior Publication Data

US 2010/0064508 A1    Mar. 18, 2010

Related U.S. Application Data

(62) Division of application No. 11/406,097, filed on Apr. 18, 2006, now Pat. No. 7,632,593.

(60) Provisional application No. 60/677,421, filed on May 3, 2005.

(51) Int. Cl.
  *H01M 8/00* (2006.01)
  *H01M 2/14* (2006.01)
  *H01M 8/04* (2006.01)
  *H01M 4/82* (2006.01)

(52) U.S. Cl.
  USPC ........... 429/535; 429/508; 429/509; 429/514; 29/623.2

(58) Field of Classification Search
  USPC .......................... 429/510, 514, 518; 29/623.2
  See application file for complete search history.

(56) References Cited

U.S. PATENT DOCUMENTS

| 6,843,960 B2 | 1/2005 | Krumpelt et al. | |
|---|---|---|---|
| 2003/0155252 A1* | 8/2003 | Juda et al. | 205/354 |
| 2003/0232230 A1* | 12/2003 | Carter et al. | 429/32 |
| 2005/0196657 A1* | 9/2005 | Sarkar et al. | 429/31 |

FOREIGN PATENT DOCUMENTS

JP    09115530    5/1997

* cited by examiner

*Primary Examiner* — Patrick Ryan
*Assistant Examiner* — Muhammad Siddiquee
(74) *Attorney, Agent, or Firm* — Joan Pennington

(57) ABSTRACT

Methods of sealing a bipolar plate supported solid oxide fuel cell with a sealed anode compartment are provided. The solid oxide fuel cell includes a cathode, an electrolyte, and an anode, which are supported on a metallic bipolar plate assembly including gas flow fields and the gas impermeable bipolar plate. The electrolyte and anode are sealed into an anode compartment with a metal perimeter seal. An improved method of sealing is provided by extending the metal seal around the entire perimeter of the cell between an electrolyte and the bipolar plate to form the anode compartment. During a single-step high temperature sintering process the metal seal bonds to the edges of the electrolyte and anode layers, the metal foam flow field and the bipolar plate to form a gastight containment.

12 Claims, 3 Drawing Sheets

METHOD OF SEALING A BIPOLAR PLATE SUPPORTED SOLID OXIDE FUEL CELL WITH A SEALED ANODE COMPARTMENT

This application is a divisional application of U.S. application Ser. No. 11/406,097, filed on Apr. 18, 2006 now U.S. Pat. No. 7,632,593. This application claims the benefit of U.S. Provisional Application No. 60/677,421, filed on May 3, 2005.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to solid oxide fuel cells (SOFCs), and more particularly, relates to an improved bipolar plate supported solid oxide fuel cell with a sealed anode compartment.

DESCRIPTION OF THE RELATED ART

Solid oxide fuel cells (SOFCs) are high temperature, for example, 500-1000° C., electrochemical devices that convert the chemical energy of gaseous fuels (hydrogen, carbon monoxide, reformed hydrocarbons or alcohol mixtures) directly into electricity. The electrolyte, for example, yttria-stabilized zirconia, is a thin gas impermeable membrane that is usually supported on a planar porous anode. The fuel electrode, or anode, normally consists of a partially sintered mixture of nickel and electrolyte particles. The oxygen electrode, or cathode, is typically made of a porous perovskite material, such as an alkaline earth-doped $LaMnO_3$, $LaFeO_3$, $LaCoO_3$, or mixtures thereof.

Solid Oxide Fuel Cells show promise as electrical power sources for many applications, ranging from large stationary power plants to auxiliary power units for vehicles. This fuel cell type is proven to have a high energy density, demonstrating over 1 $W/cm^2$ in small single cells. Moreover, SOFCs are not limited to hydrogen as a fuel. Carbon monoxide, methane, alcohols, light hydrocarbons, and distillate fuels have been shown to reform directly on the SOFC anode, thereby greatly reducing the complexity of the pre-reformer.

Oxygen from air is reduced near the cathode/electrolyte interface forming oxygen ions. These ions diffuse through the electrolyte and combine with the fuel at the electrolyte/anode interface forming water and carbon oxides as exhaust and releasing electrons. The diffusion of oxygen ions through the electrolyte and the flow of electrons through the electrodes generate useful DC electricity.

The SOFC can also be reversed to produce hydrogen from steam in a high-temperature electrolysis mode. Steam is introduced at the fuel electrode and an electrical potential is applied across the cell. Steam is converted into hydrogen by reducing the oxygen from the water molecule into negative ions and hydrogen exhausts out of the cell as product. The oxygen ions diffuse through the electrolyte to the oxygen electrode, where the ions are reoxidized and liberated as oxygen gas byproduct.

To increase power output SOFC cells, each typically producing 0.7-1.0 V, are stacked in electrical series. A stack consists of cells; bipolar plates that electrically connect adjacent cells and separate fuel and air gases; flow fields to disperse gases along the plane of the cathode and anode; gas manifolds to distribute fuel and air to the perimeter of each cell in the stack; and seals around the perimeter of the cells to prevent mixing of fuel and air.

U.S. patent application Ser. No. 10/167,917, Publication No. US 2003/0232230 A1 published Dec. 18, 2003 by John David Carter, Joong-Myeon Bae, Terry A. Cruse, James Michael Ralph, Romesh Kumar, and Michael Krumpelt, filed Jun. 12, 2002 and entitled "Solid Oxide Fuel Cell with Improved Mechanical and Electrical Properties" and assigned to the present assignee, discloses a solid oxide fuel cell (SOFC) repeat unit. The SOFC repeat unit includes an oxide electrolyte, an anode, a metallic fuel flow field, a metallic interconnect, and a metallic air flow field. The multilayer laminate is made by casting tapes of the different functional layers, laminating the tapes together and sintering the laminate in a reducing atmosphere. Solid oxide fuel cell stacks are made by applying a cathode layer, bonding the unit into a gas manifold plate, and then stacking the cells together. This process leads to superior mechanical properties in the SOFC due to the toughness of the supporting metallic layers. It also reduces contact resistances in stacking the cells since there is only one physical contact plane for each repeat unit.

The disclosed stack repeat unit includes a thin electrolyte, for example, less than 10 micrometers in thickness, supported on a porous cermet anode 100-300 micrometers thickness, which is bonded to the gas flow fields and bipolar plate in a single-step sintering process. The initial approach to sealing was to use mica gasket seals between the electrolyte and the cathode flow field. Edges of the flow fields were sealed off with metal slurry in the initial sintering process to channel the gas flow and provide a sealing surface for the gasket. While the disclosed stack repeat unit provided improvements over prior art arrangements, sealing difficulties exist as with other state-of-the-art stacking methods.

One of the major issues in building planar SOFC stacks is the development and application of seals. State-of-the-art SOFC stacks are commonly manufactured as separate components, which are assembled together during the stacking process. Seals are used to join and close off the open perimeters of the components. The placement and number of seals varies according to the stack design. In general, a seal is needed between the electrolyte and the bipolar plate around the perimeter of the anode to contain the fuel, and a seal is needed to connect each cell to the fuel manifold. It is not necessary to completely seal the cathode or air compartment except in regions adjacent to fuel flow. If a seal is electrically conductive, it cannot be applied in areas that would short-circuit the cells. Major classifications of seals include rigid bond seals, mechanical seals, and wet seals. Sealing materials most commonly used include glasses, cements, brazes, and gaskets.

Various sealing arrangements are known, for example, ceramic, glass, or glass ceramic seals have been used to assemble their co-flow SOFC stack. Also copper, nickel and silver paint or foil, and mica gaskets have been used to seal various layers together. Perimeter spacer seals have been used consisting of laminated layers of bipolar plate alloy, and copper, nickel or mica.

Several SOFC developers have formulated glass or glass ceramic materials with similar properties. The thermal expansion coefficients of rigid seals need to match those of the electrolyte and bipolar plate. The sealant must also be stable in oxidizing and reducing conditions, and it must be compliant enough to fill in gaps, but rigid enough to stop viscous flow during operation. Two problems occur with using glass seals.

The glass seals tend to react with other fuel cell materials over time and are subject to cracking on repeated or rapid heating cycles.

Metal brazes can be used to a limited extent for sealing where short-circuiting is not a concern. Most brazes used involve silver-copper or nickel alloys. Brazes using silver are expensive, but seal at low temperatures. The nickel type brazes often must be heated over 1000° C. to seal, which adds to the cost and time of assembling a stack. Non-conductive glasses or gaskets are often needed where parts must be electrically insulated.

Mica gaskets have been used by some SOFC developers because they are compliant and allow sliding to tolerate thermal expansion mismatch. The gaskets can deform to fill in gaps due to the unevenness of ceramic cells with uniform pressure. However, they require the application of constant pressure to make a seal and offer little spring back if pressure is released. They also need an adhesive to seal the gasket face to the face of the component.

Another fundamental issue in building stacks relates to the possibility of a cell fracturing within the stack. Because of the brittle nature of the ceramic components, cells within the stack may fracture, allowing fuel and air to mix and burn through the electrolyte. This event critically affects the operation of the entire stack due to the direct chemical combustion of fuel rather than the desired electrochemical combustion and because electrical insulating layers may form that reduce the stack power output and efficiency. A desirable feature would be the ability to remove defective cells and replace them with new cells. State-of-the-art planar SOFC stack designs with the seals described above do not allow a simple exchange of cells.

A principal object of the present invention is to provide an improved bipolar plate supported solid oxide fuel cell with a sealed anode compartment.

Other important objects of the present invention are to provide such improved bipolar plate supported solid oxide fuel cell with a sealed anode compartment substantially without negative effect and that overcome some of the disadvantages of known arrangements.

SUMMARY OF THE INVENTION

In brief, a bipolar plate supported solid oxide fuel cell with a sealed anode compartment is provided. The solid oxide fuel cell includes a cathode, an electrolyte, and an anode. The electrolyte is supported on the anode. The electrolyte and anode are sealed into an anode compartment with a metal perimeter seal. The metal perimeter seal extends around the perimeter of the solid oxide fuel cell between the electrolyte and the bipolar plate.

In accordance with features of the invention, the self-sealed anode compartment also contains a plurality of fuel flow fields, a plurality of metal support pillars, and the bipolar plate together with the metal perimeter seal, which together form a unitary structure.

An improved method of sealing is provided by extending a metal edge seal around the entire perimeter of the cell between an electrolyte and the bipolar plate to form the anode compartment. During a single-step high temperature sintering process the metal seal bonds to the edges of the electrolyte and anode layers, the metal foam flow field and the bipolar plate to form a gastight containment. After the assembly has been sintered, inlet and outlet holes are drilled into the seal and metal tubing is brazed into the holes, forming gas tight connections to the anode compartment.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
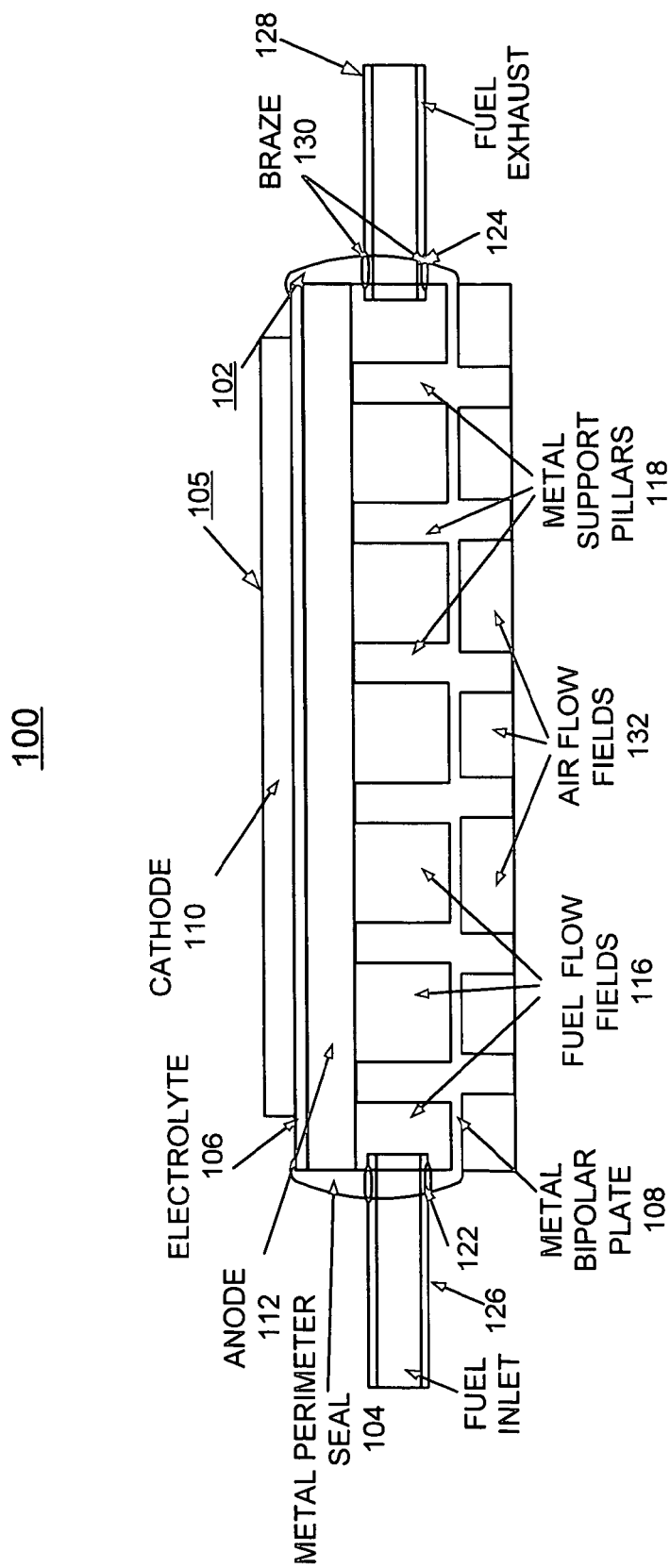
FIG. 1 is a cross sectional view illustrating a bipolar plate supported solid oxide fuel cell with a sealed anode compartment in accordance with the preferred embodiment.
Figure 2:
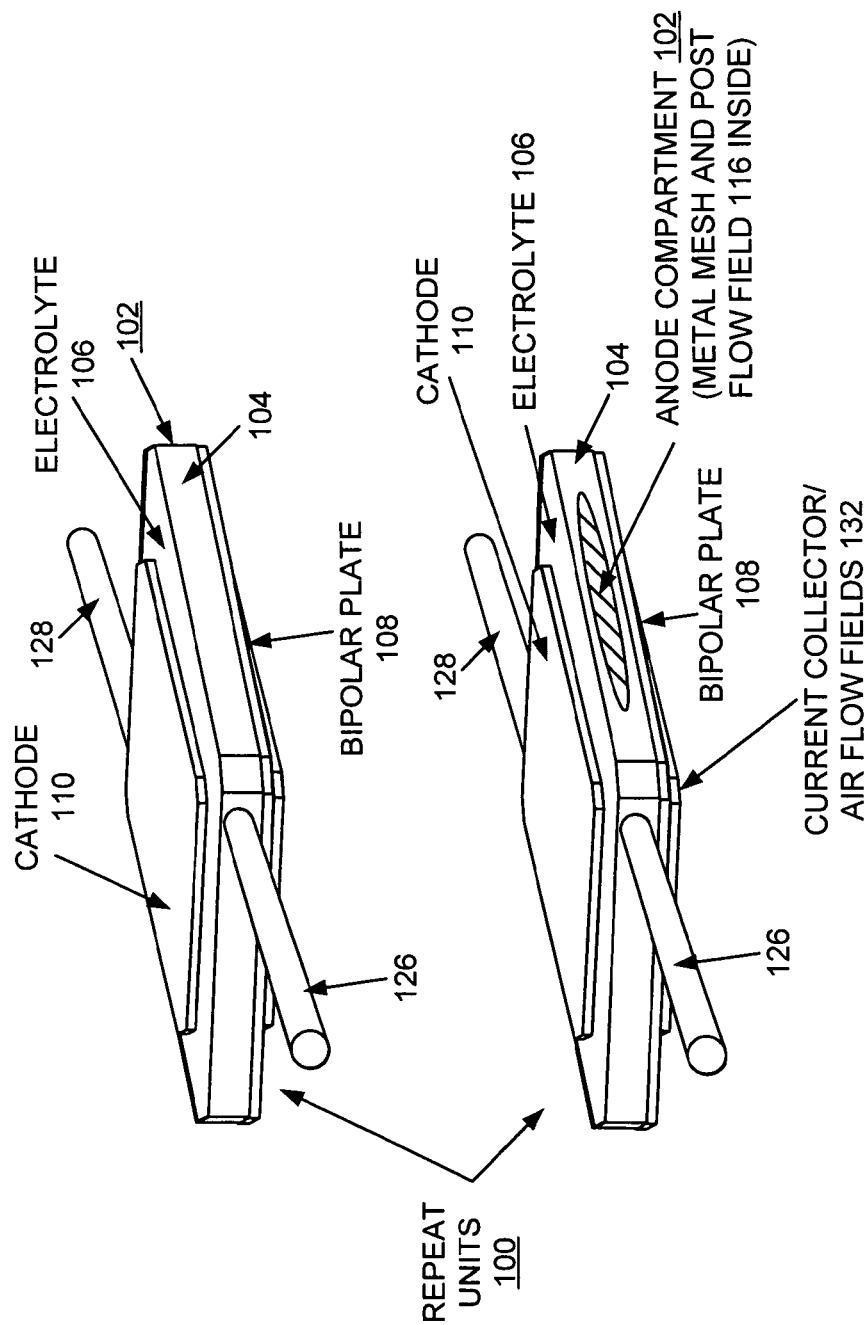
FIG. 2 is a perspective view illustrating a pair of the bipolar plate supported solid oxide fuel cells with the sealed anode compartment of FIG. 1 in accordance with the preferred embodiment.

Having reference now to the drawings, in FIGS. 1 and 2 there is shown in cross-sectional view a bipolar plate-supported (solid oxide fuel cell) SOFC repeat unit generally designated by the reference character 100 with a sealed anode compartment generally designated by the reference character 102 in accordance with the preferred embodiment.

In accordance with features of the present invention, an improved method of sealing is provided by extending a metal edge seal 104 around the entire perimeter of the SOFC repeat unit 100 between an electrolyte 106 and an interconnect or bipolar plate 108 to form the anode compartment 102.

An electrochemically active cell generally designated by the reference character 105 of the SOFC repeat unit 100 includes a cathode 110, electrolyte 106, and an anode 112. The electrolyte 106 is supported on the planar anode 112. The electrolyte 106 and anode 112 are sealed into the supporting anode compartment 102 with the metal perimeter seal 104. This self-sealed anode compartment 102 also contains a plurality of fuel flow fields 116, a plurality of metal support pillars 118, and the bipolar plate 108 together with the metal perimeter seal 104, all of which are unitized as a single piece or unitary structure.

In accordance with features of the present invention, during a single-step high temperature sintering process the metal seal 104 bonds to the edges of the electrolyte and anode layers 106, 112, the metal foam flow field 116 and the bipolar plate 108 to form a gastight containment 102. After the assembly has been sintered, a pair of generally opposed inlet and outlet holes 122, 124 is drilled into the seal 104. A respective inlet metal tubing 126 and an outlet metal tubing 128 is brazed into the holes 122, 124, forming gas tight connections to the anode compartment 102. As shown, a brazing 130 forms the gas tight connections between both the inlet metal tubing 126 and the outlet metal tubing 128 and the metal perimeter seal 104 defining the anode compartment 102. A plurality of air flow fields 132 is defined below the bipolar plate 108.

The fuel flow fields 116 are filled with metal foam that supports the cell 105, the metal support pillars 118 and perimeter seals defined by the metal perimeter seal 104, and provides electrical interconnection between the anode 112 and the bipolar plate 108. The air flow fields 132 having the same dimensions as the cathode 110 are formed on the bottom of the bipolar plate 108 to distribute air and electrically interconnect the underlying cathode 110 or an end plate (not shown) at an end SOFC repeat unit 100 of a stack of multiple SOFC repeat units 100.

The inlet metal tubing 126 and the outlet metal tubing 128 preferably are steel tubes that are sealed into the pre-drilled holes 122, 124 in the metal perimeter seal 104 with an active metal braze 130. The cathode is applied before stacking the cells and is sintered in the initial heat-up of the stack.

As shown in FIG. 2, there is shown two SOFC repeat units 100 illustrating the stacking concept of the preferred embodiment with generally square planer cells. However it should be understood that the present invention is not limited to square cells, but extends to circular and other planar cell geometries as may be advantageous for a particular application. Since the cells are not bonded together, a damaged cell can be readily removed from the stack and replaced. For example, the cathode 110 of the underlying cell 100 is restored and the stack is reassembled.

Single cells and two-cell stacks of this invention have been made and tested including a 2×2 $in^2$ square cell. Both square and circular cells have been fabricated. A 2-cell stack has been built and obtained 2 V open circuit potential. Single circular cells achieved power densities of 130 $mW/cm^2$.

The SOFC repeat units 100 are high temperature, for example, 500-1000° C., electrochemical devices that convert the chemical energy of gaseous fuels, such as hydrogen, carbon monoxide, reformed hydrocarbons or alcohol mixtures, directly into electricity. The electrolyte 106 is a thin gas impermeable membrane, for example, formed of yttria-stabilized zirconia. The fuel electrode, or anode 112 is formed, for example, of a partially sintered mixture of nickel and zirconia particles. The oxygen electrode, or cathode 110, is formed of, but not limited to for example, a porous perovskite material, such as an alkaline earth-doped $LaMnO_3$, $LaFeO_3$, $LaCoO_3$, or mixtures thereof.

The interconnect or bipolar plate 108 may consist of a single metal, such as stainless steel or a graded composite of metals that are arranged so that one surface of the interconnect 108 consists of a metal suited to the cathode 110 and the other surface consists of a metal suited to the anode compartment 102. U.S. Pat. No. 6,843,960 issued Jan. 18, 2005 to Michael Krumpelt, Terry A. Cruse, John David Carter, Jules L. Routbort, Romesh Kumar and entitled "COMPOSITIONALLY GRADED METALLIC PLATES FOR PLANAR SOLID OXIDE FUEL CELLS" discloses a method for preparing compositionally graded metallic plates and compositionally graded metallic plates suitable for use as interconnects for solid oxide fuel cells. For example, the disclosed compositionally graded metallic plates may be used to implement the bipolar plate 108. The subject matter of the above-identified related U.S. patent application is incorporated herein by reference.

Figure 3:
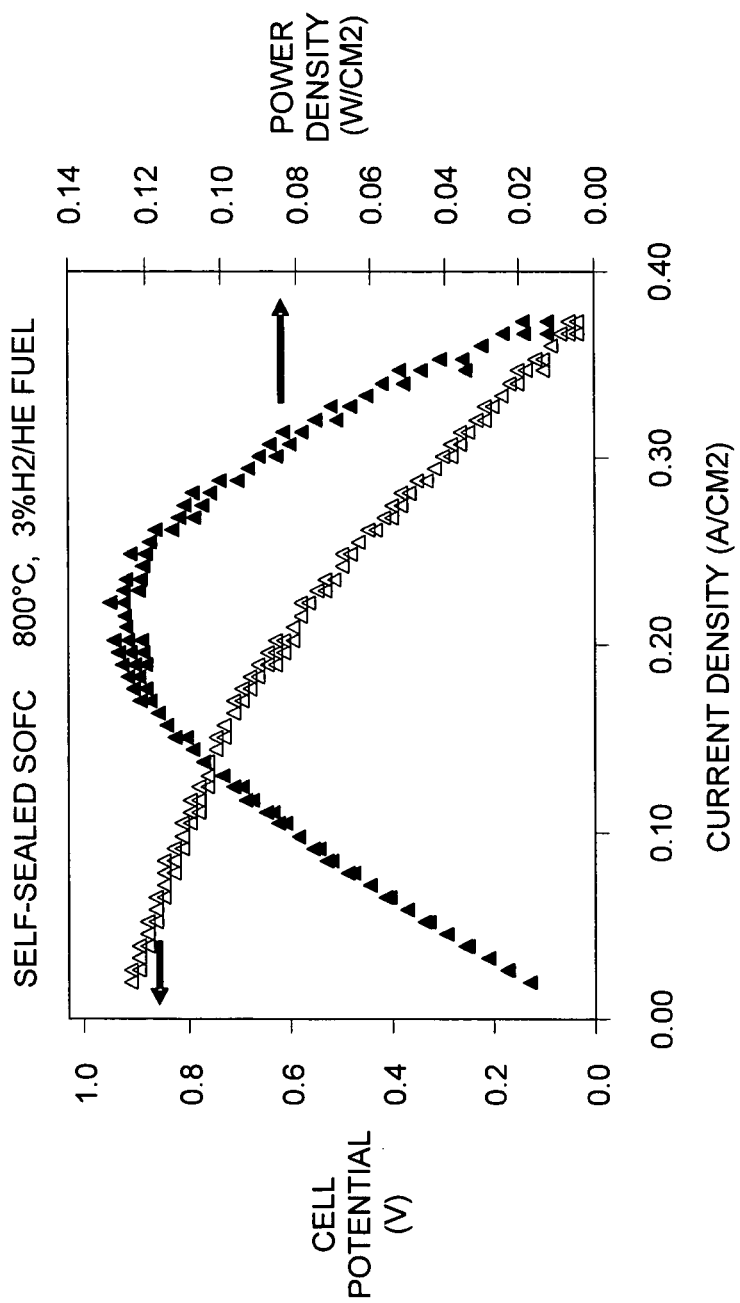
FIG. 3 illustrates an electrochemical performance of a single cell solid oxide fuel cell repeat unit of FIG. 1 in accordance with the preferred embodiment.

FIG. 3 shows the electrochemical performance of a single cell. The open triangles represent the voltage-current density curve. The closed triangles represent the power density and a function of current density. In the linear portion of the curve the area specific resistance of the cell is 1.5 $ohm-cm^2$. The performance of the single cell is shown for operation at 800° C., using 3% $H_2$ balance He fuel.

In accordance with features of the present invention, the new SOFC repeat unit 100 with the sealed anode compartment 102 gains additional benefits. A cathode chamber generally is not required since the cathode 110 does not need to be completely sealed as it is exposed to air; the air can flow in any direction over the cathode 110, such as co-flow, cross-flow or counter-flow with respect to fuel flow, for example, by using stack insulation as manifolding.

In accordance with features of the present invention, it is not necessary to obtain perfectly flat and parallel stack repeat units 100 to build stacks with hermetic seals. In ceramic and metal powder processing it is difficult to obtain flat pieces from a sintering process. This is especially complicated when co-sintering multilayers containing multiple materials. Such sintered parts often require a separate, expensive flattening or machining process to obtain flat, parallel surfaces for hermetic seals. These self-sealed stacking SOFC repeat units 100 eliminate the need for perfectly flat cells.

While the present invention has been described with reference to the details of the embodiments of the invention shown in the drawing, these details are not intended to limit the scope of the invention as claimed in the appended claims.

What is claimed is:

1. A method of sealing a solid oxide fuel cell (SOFC) comprising the steps of:

providing a configuration of the solid oxide fuel cell (SOFC) including a bipolar plate separating an air flow field from a fuel flow field, an anode disposed on said fuel flow field above said bipolar plate, an electrolyte supported on the anode, and a cathode supported by the electrolyte, an anode compartment containing said electrolyte, said anode and said fuel flow field, said anode compartment having a metal perimeter edge seal, providing said metal perimeter edge seal around the entire perimeter of the solid oxide fuel cell extending between said electrolyte and said bipolar plate to form said anode compartment; and performing a single-step high temperature sintering process for bonding the metal perimeter edge seal to the edges of the electrolyte and said anode, said metal flow field and said bipolar plate to form a gastight containment having said metal perimeter edge seal; and forming an inlet opening and an outlet opening in said metal perimeter edge seal providing a fuel inlet and a fuel exhaust.

2. A method of sealing a solid oxide fuel cell (SOFC) as recited in claim 1 includes the step of brazing a fuel feed tube within said inlet opening and an exhaust tube within said outlet opening for forming gas tight connections to said anode compartment.

3. A method of sealing a solid oxide fuel cell (SOFC) as recited in claim 2 wherein said fuel feed tube and said exhaust tube are stainless steel tubes; and wherein said brazing includes an active metal braze.

4. A method of sealing a solid oxide fuel cell (SOFC) as recited in claim 1 wherein said inlet opening and said outlet opening are drilled into said metal perimeter edge seal.

5. A method of sealing a solid oxide fuel cell (SOFC) as recited in claim 1 wherein said metal perimeter edge seal, the bipolar plate and the fuel flow field are formed of an identical material.

6. A method of sealing a solid oxide fuel cell (SOFC) as recited in claim 1 wherein said metal perimeter edge seal, the bipolar plate and the fuel flow field are formed of stainless steel.

7. A method of sealing a solid oxide fuel cell (SOFC) as recited in claim 1 wherein said metal perimeter edge seal, the bipolar plate and the fuel flow field are formed of a graded composite of metals.

8. A method of sealing a solid oxide fuel cell (SOFC) comprising the steps of:

providing a configuration of the solid oxide fuel cell (SOFC) including a bipolar plate separating an air flow field from a fuel flow field, an anode, an electrolyte supported on the anode disposed on said fuel flow field above said bipolar plate, an electrolyte supported on the anode, and a cathode supported by the electrolyte, an anode compartment containing said electrolyte, said anode and said fuel flow field, and a cathode supported by the electrolyte, providing a metal perimeter edge seal around the entire perimeter of the solid oxide fuel cell (SOFC) extending between said electrolyte and said bipolar plate to form said anode compartment having said metal perimeter edge seal; and performing a single-step high temperature sintering process for bonding the metal perimeter edge seal to the edges of the electrolyte and said anode, said metal flow field and said bipolar plate to form a gastight containment;

drilling into said metal perimeter edge seal for forming an inlet opening in said metal perimeter edge seal for providing a fuel inlet to said fuel flow field, and drilling into said metal perimeter edge seal for forming an outlet opening in said metal perimeter edge seal for providing a fuel exhaust from said fuel flow field.

9. A method of sealing a solid oxide fuel cell (SOFC) as recited in claim 8 includes providing a fuel feed tube within said inlet opening and an exhaust tube within said outlet opening.

10. A method of sealing a solid oxide fuel cell (SOFC) as recited in claim 9 wherein providing said fuel feed tube within said inlet opening and said exhaust tube within said outlet opening includes brazing said fuel feed tube within said inlet opening and said exhaust tube within said outlet opening.

11. A method of sealing a solid oxide fuel cell (SOFC) as recited in claim 8 includes forming said metal perimeter edge seal, the bipolar plate and the fuel flow field of an identical material.

12. A method of sealing a solid oxide fuel cell (SOFC) as recited in claim 8 includes forming said metal perimeter edge seal, the bipolar plate and the fuel flow field of stainless steel.

* * * * *